United States Patent [19]

Pocci

[11] Patent Number: 4,790,515
[45] Date of Patent: Dec. 13, 1988

[54] FORCE MULTIPLIER USEFUL AS A LIFTING DEVICE

[76] Inventor: Silvano Pocci, Eric Dr., Kinnelon, N.J. 07405

[21] Appl. No.: 78,398

[22] Filed: Jul. 27, 1987

[51] Int. Cl.⁴ .................................. B24B 4/06
[52] U.S. Cl. ........................................ 254/104
[58] Field of Search .............. 254/104, 42; 269/234; 248/180; 52/745–747

[56] References Cited

U.S. PATENT DOCUMENTS

| | | | |
|---|---|---|---|
| 1,544,331 | 6/1925 | Malmgren | 254/104 |
| 3,774,352 | 11/1973 | Weber | 254/104 |
| 3,836,118 | 9/1974 | Meyer | 254/104 |
| 4,354,770 | 10/1982 | Block | 254/104 |
| 4,382,580 | 5/1983 | Hellander | 254/104 |

*Primary Examiner*—Robert C. Watson
*Attorney, Agent, or Firm*—Bernard J. Murphy

[57] ABSTRACT

The Multiplier comprises a housing in which is set a base having an elongate trackway therein. An open-center frame is set upon the base above the trackway, and a lifting block is set upon the frame to elevate whatever is set upon it. Within the trackway are disposed a piston-hydraulically-operated power wedge, a pressure wedge which contactingly engages the lifting block, and a wedge-shaped separator plate between the pressure wedge and the power wedge. Asperities, in the form of graduated steps, are formed in the mating surfaces of the lifting block, and frame, and pressure wedge and lifting block. Hydraulic operation of the power wedge, in cyclic translations, causes the pressure wedge, through the separator plate, to raise the lifting block slightly above the frame, in each stroke, and a compression spring advances the pressure wedge to receive the lifting block thereupon. A spring also advances the pressure wedge, with each cycle, to position if for another lift of the lifting block.

19 Claims, 3 Drawing Sheets

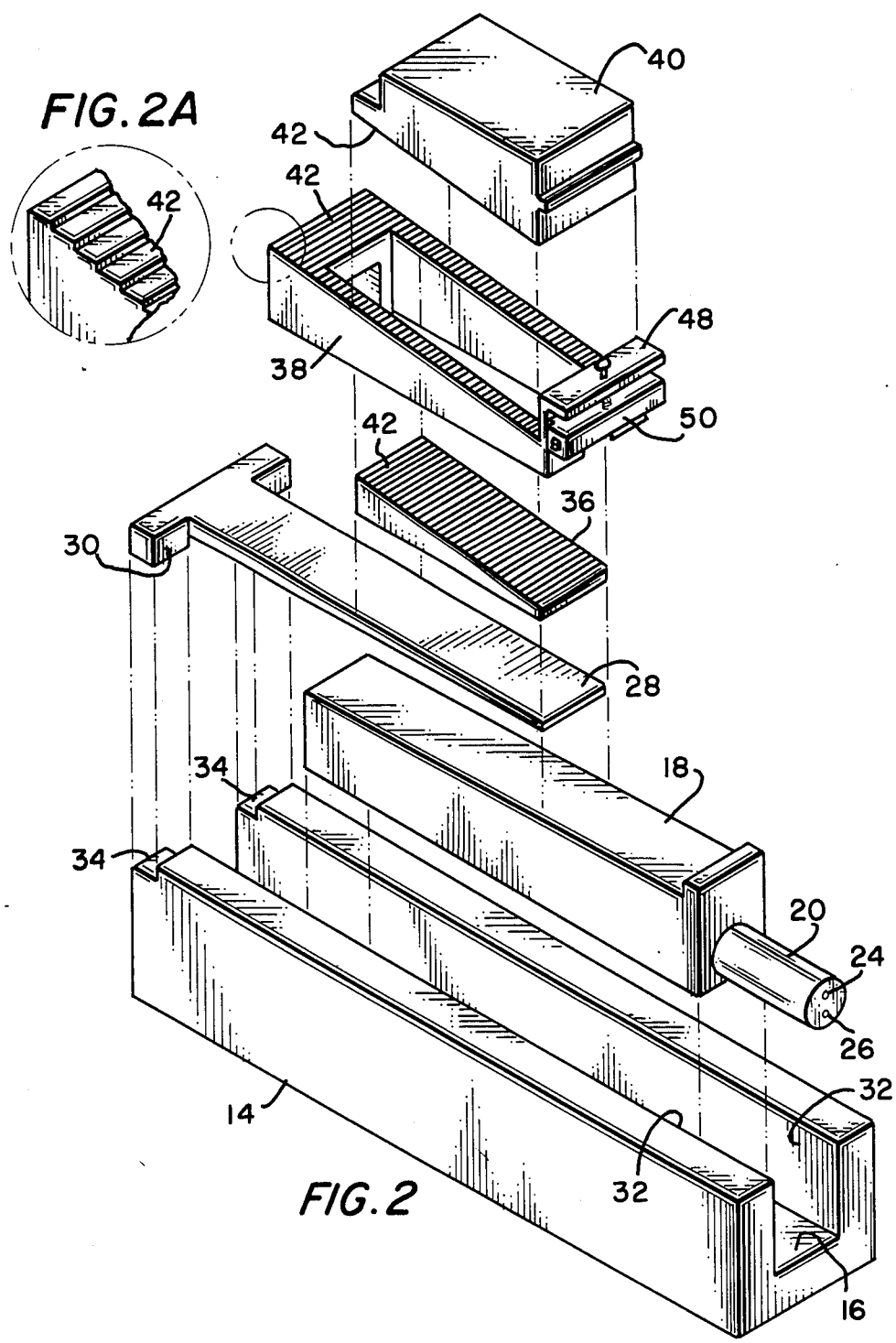

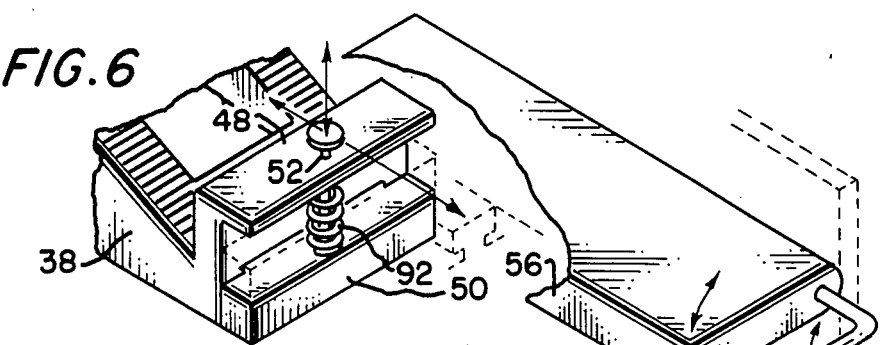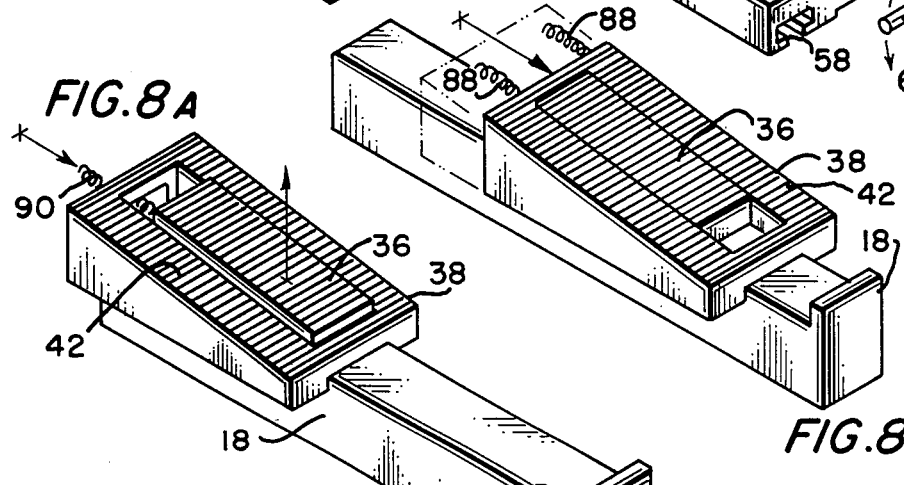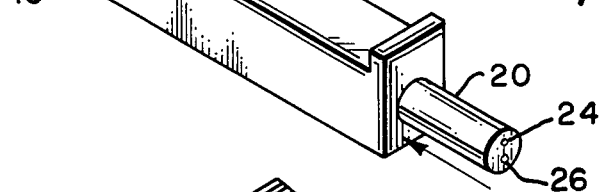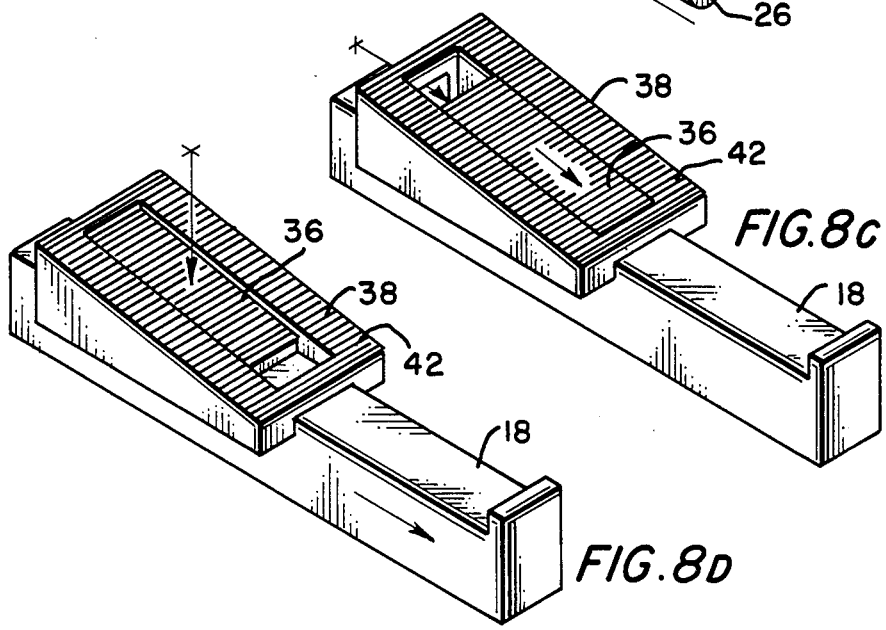

FORCE MULTIPLIER USEFUL AS A LIFTING DEVICE

This invention pertains to force multipliers, and in particular to a force multiplier especially adapted for use as a powerful lifting device.

Force multipliers of the type to which the invention pertains are well known in the prior art. However, the known types are either very complicated devices, or are of unduly limited power.

It is an of this invention to set forth a force multiplier, useful as a lifting device, which has very few parts, of uncomplicated configuration, and which exerts a remarkable force.

It is particularly an object of this invention to set forth a force multiplier useful as a lifting device, comprising a housing; and a base set within said housing; wherein said base has a trackway formed therein; a frame set upon said base above said trackway; a lifting block set upon said frame and astride said trackway; and means within said trackway operative for elevating said lifting block above said frame.

Further objects of this invention, as well as the novel features thereof, will become more apparent by reference to the following description taken in conjunction with the accompanying figures, in which:

FIG. 2 is an exploded view of the housing confined components of the force multiplier, the housing not being shown;

FIG. 2A is an enlarged detail showing the steps formed on the upper surface of the open-center frame;

FIG. 6 is a cut-away, perspective view of a portion of the open-center frame, engagement block, and the block lifting bar;

FIGS. 8a through 8d are sequence illustrations showing the cooperation of the power wedge, the pressure wedge, the open-center frame, and the lifting block.

Figure 1:
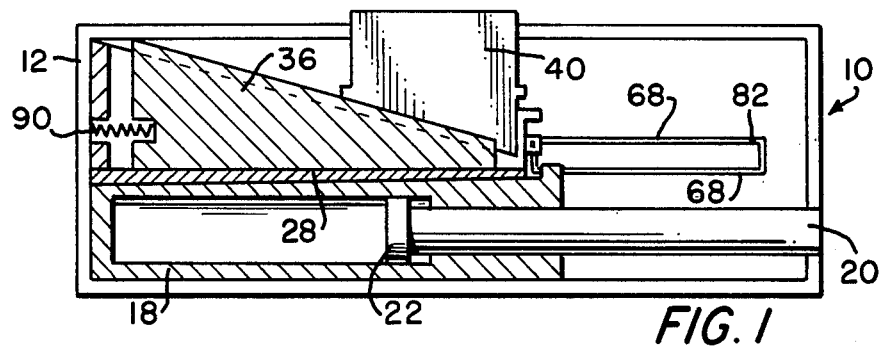
FIG. 1 is a longitudinal cross-sectional view of the novel force multiplier according to an embodiment of the invention.
Figure 3:
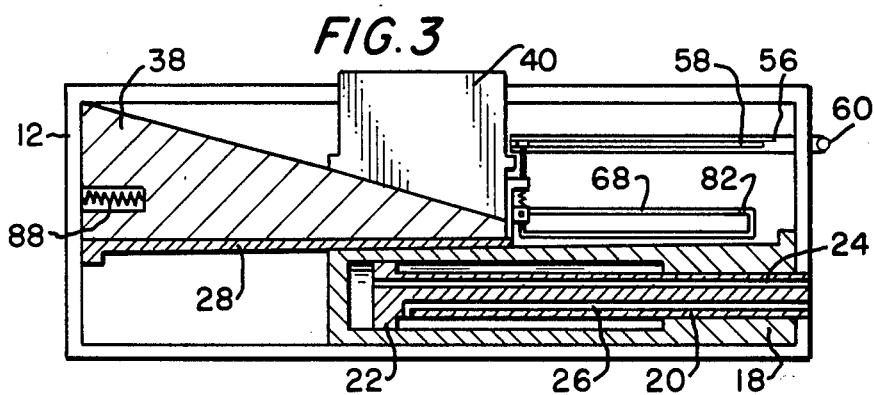
FIG. 3 is a cross-sectional view like that of FIG. 1 showing the hudraulic fluid channels in the piston rod of the power wedge.
Figure 4:
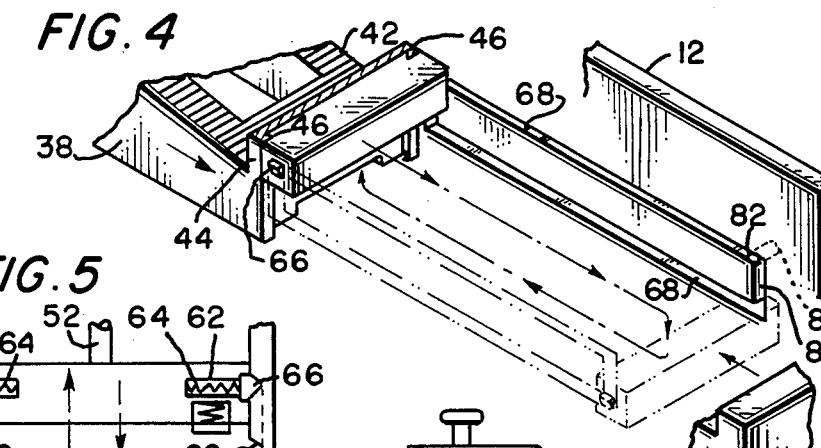
FIG. 4 is a fragmentary view of the leading end of the open-center frame and the engagement block.
Figure 5:
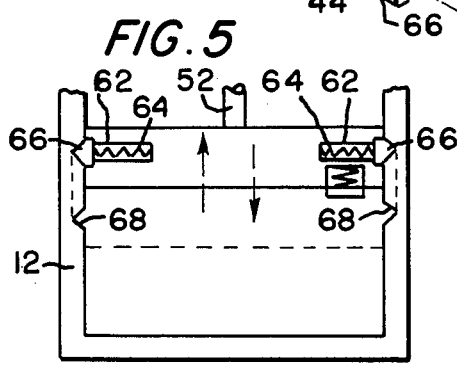
FIG. 5 is an elevational view of the leading end of the open-center frame engagement block, and grooved side walls of the housing.
Figure 7:
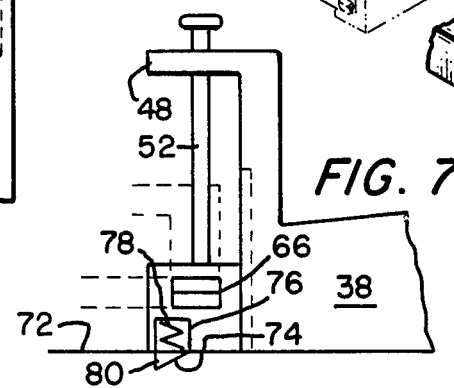
FIG. 7 is a side view of the engagement block latching means.

As shown in the figures, the novel force multiplier 10 comprises a housing 12 in which are confined a base 14 having an open trackway 16 formed therein. Received in the trackway 16 is a power wedge 18 which has a piston rod 20 projecting therefrom, said rod 20 being fixed to the housing 12. The power wedge 18 is hollow and has therewithin a piston 22. Channels 24 and 26 formed in the piston rod admit and discharge hydraulic fluid to cause the power wedge 18 to travel through the trackway 16 and, as will be seen, elevate a lifting block.

The power wedge 18 has its greatest thickness adjacent to the piston rod end thereof. Set upon the power wedge 18 is a separation plate of wedge-shaped configuration 28, the same having its greatest thickness adjacent to the thinner end of the power wedge 18. The thicker end of the separation plate 28 has a T-shape thereat defined by oppositely extending ears 30. An end of the base 14 in the parallel walls 32 thereof has a pair of right-angular reliefs 34 which nest the ears 30 of the separation plate 28.

A pressure wedge 36, tapered in the same manner as the separation plate 28, is slidably engaged with, and set upon the separation plate 28. The pressure wedge 36 is confined within an open-center frame 38 which is set upon the walls 32 of the base 14. Finally, a lifting block 40 is set upon the frame 38. The uppermost surface of the frame 38 has a multiplicity of uniformly spaced apart, graduated steps 42 formed therein. Too, the underlying surface of the lifting block 40 has same steps 42 formed therein. Additionally, the uppermost surface of the pressure wedge 36 has self-same steps 42 formed therein.

The open-center frame 38 has an abutment 44 rising from the narrow end thereof in the face of which are formed parallel, dove-tail type tracks 46. Too, an overhang or ledge 48 surmounts the tracks 46. An engagement block 50, with complementary dove-tail type grooves formed therein, is slidably engaged wit the tracks 46. The ledge 48 has a borehole formed therethrough and a rod 52, fixed in the block 50, projects therefrom and penetrates the ledge borehole. The outermost end of the rod 52 has a knob thereat. A lifting bar 56 engages the knob of rod 52 by means of a T-shaped groove 58 formed in the bar 56. The bar 56 extends to the forward end of the base 14, and therat has a handle 60.

The engagement block 50 has a pair of holes 62 formed in the opposite sides thereof. Compression springs 64 are nested therein and biasingly urge tabs, slidably disposed in the holes 62, outwardly. The tabs 66 engage rectangular tracks 68 formed in the walls 70 of the housing 12. In the floor 72 of the base 14 is formed a hole 74. Too, in the underside of the engagement block 50 is a hole 76. The latter nests a compression spring 78 and a latching tab 80. The spring 78 biases the latching tab 80 outwardly to engage the hole 74 (when the two are in alignment).

A control dowel 82 is slidably disposed in a sidewall of the base through a hole 84 formed therein. The dowel 82 protrudes into an upper portion of the tracks 68 just in advance of a vertical connection 86 of the tracks 68. Finally, compression springs 88 and 90 are interposed between the housing 12 and the ends of the frame 38 and the pressure wedge 36.

In operation, the thrust of the power wedge 18 on its power stroke causes a movement, through the separator plate 28, to occur on the pressure wedge 36 and, hence, to the lifting block 40. The design of the steps 42 on the common, interfacing surfaces of the pressure wedge 36, the frame 38, and the equal (but oppositely-directed) steps 42 of the lifting block 40, is such that all are able to hold their position without slippage. The upward movement by the pressure wedge 36 creates a void in the surface between the lifting block 40 and the upper surface of the frame 28. This void is immediately filled by a movement of the frame due to the bias of the spring 88.

The retraction of the power wedge 18 causes the pressure wedge 36 to descend and create a void between its upper surface and the lower, underlying surface of the lifting block 40. This occurs because the frame 38 has filled the void and is holding the lifting block in its elevated position. The aforesaid void, now, is filled by the movement of the pressure wedge, due to the bias of the spring 90, forward to the relative positions each wedge held at the beginning of the cycle. With each stroke of the power wedge 18, the action continues, cyclically moving the lifting block 40 successively higher.

The relationship between the mechanical advantage of the power wedge 18 (i.e., its rise relative to its length) and the width and height of the steps 42 of the pressure wedge 36 and the frame 38, determines: A—the power to be designed into the force multiplier 10, and B—the height the lifting block 40 is able to travel.

The generalized rules of the design of my novel force multiplier 10 are: (a) the amount of upward distance travelled by the pressure wedge 36 upon completion of the power stroke must enable a minimum of two steps 42 of the frame 38 to advance into the void. That is, if the force multiplier 10 is designed so the power wedge's mechanical advantage is such that the pressure wedge 36 is moved upward 0.020", then the step height must not exceed 0.009", enabling the minimum two steps to fill the void. As for the other rule: (b), the step height divided by the step width, times the distance that the frame 38 travels equals the height attained by the lifting block 40, as follows:

step height÷step width×frame distance=lifting block height 0.009÷0.050×6 32 1.08" height the design of each force multiplier 10 to fill individualized needs must take these rules into account.

With it is the hydraulic fluid under ten thousand p.s.i. travelling through the channels 24 and 26 in the stationary piston rod 20 which furnishes the power to the force multiplier 10, it is the engagement block 50 which provides the means by which the force multiplier 10 is implemented. Engagement block 50 also provides the means by which the lifting can be discontinued at any point and the force multiplier 10 returned to the start position. Additionally, the control dowel 82 is provided to discontinue the lifting procedure when the force multiplier 10 attains its design height. The engagement block 50 is also able to automatically return the force multiplier 10 to start position, if: (a) the control dowel 82 has not been engaged (i.e., intruded into the track 68), or (b) the control dowel 82 had been engaged, but is now placed in the dis-engaged position.

The engagement block 50 is under constant downward pressure, due to the spring 92 which envelps the rod 52. Accordingly, the lifting can only begin when the engagement block 50 is pulled upwardly, against the bias of the spring 92, along a vertical portion of track 68, but the use of the handled bar 56, until the tabs 66 reach the top of the track 68. By this action the engagement block 50, having disengaged the latching tab 80 from the hole 74, and having reached the point at which the frame 38 (under the bias of the spring 88) can move forward along the horizontal track 68, and does so.

Each stroke of the power wedge 18 creates a void into which the frame 38 moves forward, and the engagement block 50 carried therewith is able to ride along the track 68.

If at any point during the lifting procedure it is desired to return the force multiplier 10 to the beginning of the cycle, the hydraulic power is discontinued at a point where the power wedge 36 is in the start position, and the engagement block 50 is pushed downward by the bar 56. This is possible because the tabs 66, of triangular shape, can be forced into the engagement block holes 64, thus enabling the engagement block 50 to move downward and into engagement with the lower, "return" track 68.

It is to noted that the power wedge 36 has been able to avoid impingement with the engagement block 50, and ride unobstructed into the frame 38 while the lifting procedure is in operation, because the engagement block 50 had been in its upper postioning. Now, however, with the engagement block 50 lowered to its "return" track 68, the power wedge 36 has its path blocked.

At this point, re-activation of the hydraulic pressure causes the power wedge 36 to move forcefully forward pushing the engagement block 50, along with the frame 38, back to a start point. Then, the latching tab 80, at the bottom of the engagement block 50, drops into the hole 74 and locks up the force multiplier 10. This occurs when the power wedge 36 has reached its full forward travel, and any subsequent reciprocation cannot re-start the device until the engagement block 50 is again lifted by the bar 56.

If the lifting procedure has not been interrupted, the lifting will continue; the engagement block 50 on the frame 38 will travel forward along the upper track 68. If the control dowel 82 has not been intruded into the track 68, the engagement block 50 will travel fully along the track 68 until it reached the vertical portion 86. Upon reaching the vertical portion 86, the engagement block 50 will be forced downwardly by the spring 92. Resultantly, the power wedge 36 will push the engagement block 50 back along the "return" track 68 and the latching tab 80 will latch into the hole 74, locking up the force multiplier 10.

I claim:

1. A force multiplier useful as a lifting device, comprising:
    a housing; and
    a base set within said housing; wherein
    said base has a trackway formed therein;
    an open-center frame slidably and removably set upon said base above said trackway;
    a lifting block set upon said frame and astride said trackway; and
    means within said trackway operative for elevating said lifting block above said frame.

2. A force multiplier, according to claim 1, wherein:
    said lifting block and said frame have mutually-engaging surfaces; and
    said surfaces have asperities formed thereon.

3. A force multiplier, according to claim 1, wherein:
    said elevating means comprises a power wedge slidably disposed in said trackway beneath said frame and said lifting block.

4. A force multiplier, according to claim 3, wherein:
    said elevating means further comprises a wedge-shaped separation plate set upon said power wedge.

5. A force multiplier, according to claim 4, wherein:
    said elevating means further comprises a pressure wedge interposed between said separation plate and said lifting block.

6. A force multiplier, according to claim 5, wherein:
    said pressure wedge is enclosed by said frame.

7. A force multiplier, according to claim 6, wherein:
    said lifting block and said frame have mutually-engaging surfaces, and said pressure wedge and said lifting block also have mutually-engaging surfaces; and all said surfaces have asperities formed thereon.

8. A force multiplier, according to claim 6, wherein:

said means elevating means further comprises a first biasing means interposed between said housing and said frame for urging said frame in a given direction, and a second biasing means interposed between said housing and said pressure wedge for urging said pressure wedge in said given direction.

9. A force multiplier, according to claim 3, wherein:

said power wedge comprises a wedge-shaped, hollow piston;

said piston being slidably engaged with a piston rod;

said piston rod being fixed to said housing, and having channels formed therewithin, and opening onto the hollow of said piston, for admitting hydraulic fluid under pressure into said piston to effect translation of said piston along said piston rod.

10. A force multiplier, according to claim 7, wherein: said asperities comprise graduated steps.

11. A force multiplier, according to claim 7, wherein:

said power wedge has a given axis of translation; and said asperities comprise uniformly spaced apart, graduated steps which lie transverse to said axis.

12. A force multiplier, according to claim 1, wherein:

said housing has parallel side walls;

said side walls have grooved tracks, of rectangular conformation, formed therein; and said open-center frame carries means thereon which slidably rides in said tracks.

13. A force multiplier, according to claim 12, wherein:

said open-center frame has parallel, dove-tail type grooves formed in the narrower end thereof; and said means carried by said open-center frame comprises an engagement block;

said engagement block has tabs projecting from opposite ends thereof which engage said rectangular tracks;

said ends of said block have recesses formed therein;

said tabs are slidably disposed in said recesses; and compression springs are interposed between said tabs and inner ends of said recesses.

14. A force multiplier, according to claim 13, wherein:

said narrower end of said open-center frame has a cantilevered ledge projecting therefrom;

said ledge has a borehole formed therein;

said engagement block has a rod fixed therein which projects therefrom perpendicularly;

said rod penetrates said borehole and projects thereabove; and biasing means are interposed between said engagement block and said ledge to urge said engagement block away from said ledge.

15. A force multiplier, according to claim 14, wherein:

and end of said rod, furtherest from said engagement block, has a knob fixed thereto; and further including a lifting bar; wherein said lifting bar has a T-shaped groove formed therein which slidably engages said knob;

said bar has an end which terminates with an end of said base; and said end of said bar has a handle fixed thereto.

16. A force multiplier, according to claim 13, wherein:

said base has a floor between and joining said side walls thereof;

said floor has a hole formed therein;

said engagement block has a latching means for latchingly engaging said floor hole.

17. A force multiplier, according to claim 16, wherein:

said engagement block has a borehole formed in an underside thereof;

said latching means comprises a plunger slidably engaged with said borehole, and a compression spring interposed between said plunger and the innermost end of said borehole.

18. A force multiplier, according to claim 13, further including:

means intrusive into said dove-tail grooves, and engaged with one of said side walls, for prohibiting travel of said engagement block therebeyond and, consequently, interdicting travel of said pressure wedge likewise.

19. A force multiplier, according to claim 18, wherein:

said travel inhibiting and prohibiting means comprises a dowel;

said one side wall has a hole formed therein; and said dowel is slidably engaged with said side wall hole.

* * * * *